Nov. 22, 1949     H. A. PETERSON     2,489,106
ELECTRIC COMPUTER
Filed Oct. 3, 1947
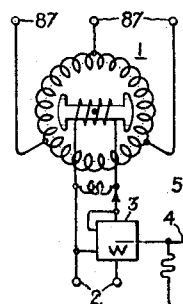
Fig. 1.
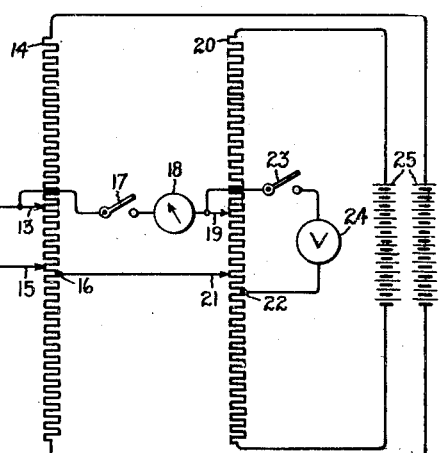
Fig. 2.
Fig. 4.
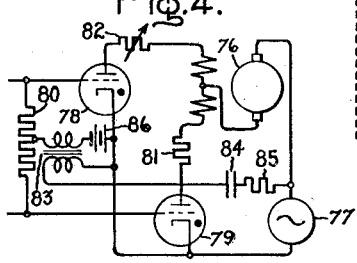
Fig. 3.
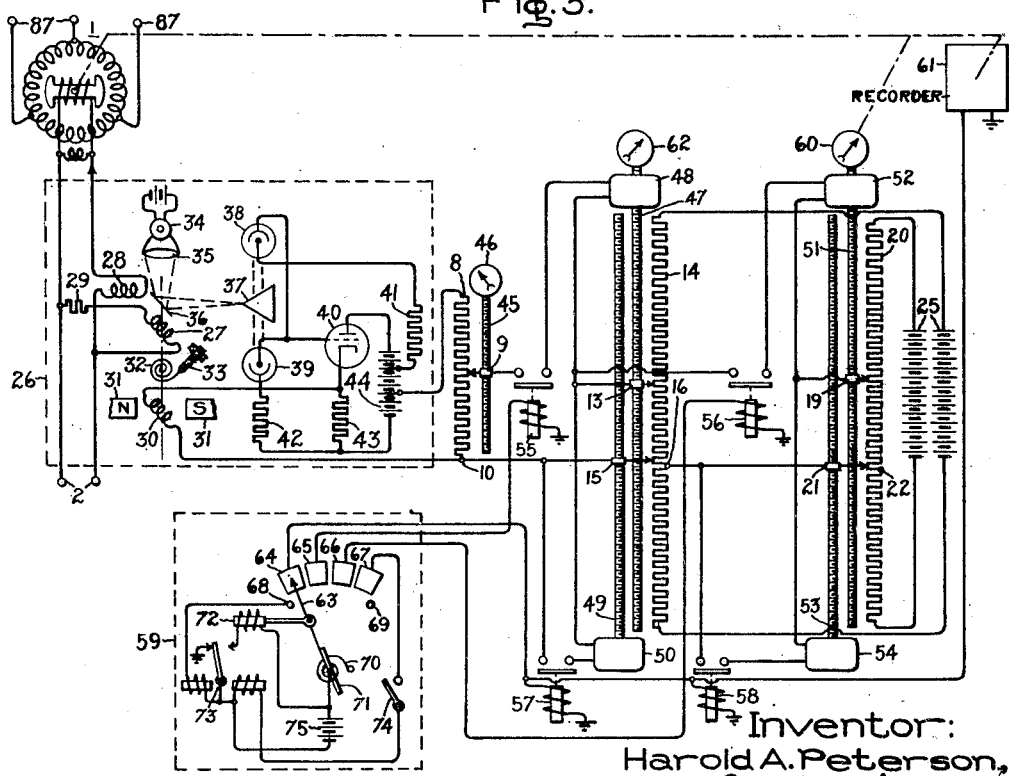
Inventor:
Harold A. Peterson,
by Browell S. Mack
His Attorney.

Patented Nov. 22, 1949

2,489,106

UNITED STATES PATENT OFFICE 2,489,106

ELECTRIC COMPUTER

Harold A. Peterson, Madison, Wis., assignor to General Electric Company, a corporation of New York Application October 3, 1947, Serial No. 777,719

3 Claims. (Cl. 235—61)

My invention relates to electric computers and particularly to an electric computer for use with a generator unit in a network analyzer in the study of electric power system transient stability.

A study of transient stability in a many-machine power transmission system involves a difficult simultaneous solution of a set of differential equations, which in the past has been an obstacle to making such studies. The method of attack presently employed in the art is to set up a representation of the electric power system on a network analyzer, balance the loads and generation in accordance with the desired initial conditions, and perform a step-by-step analysis to determine the successive angular positions of each machine respectively at the ends of successive discrete time intervals of short, arbitrarily predetermined length. In other words, short time intervals are chosen during each of which the power output and the acceleration of each machine are assumed to be constant, and the change in angular position of each machine during each such time interval is computed. If the intervals chosen are sufficiently short, the series of "constant" values of power output and acceleration used will closely approximate the actual, continuously varying power output and acceleration values, and the successive angular positions can be computed to any desired degree of accuracy. These successive angular positions are plotted to yield the "swing curve" for each machine. In this method, each machine in the system is represented by a Selsyn generator unit in the network analyzer. Such generator units commonly have three-phase stator windings all of which are excited from a common three-phase electric source and single-phase rotor windings connected to the electric network representing other parts of the power system under study. The Selsyn generator units operate as transformers: their rotors do not continuously rotate but the angular position of each rotor is adjustable to duplicate the phase relationships of the corresponding machines in the power system.

First the initial power output and the initial angular setting for each such generator unit are determined under the balanced initial conditions. The desired fault condition is then imposed on the network to initiate transient conditions, and the power output of each generator unit is again determined. The change in power output from the initial power output of a generator unit represents the accelerating torque acting upon the corresponding machine in the power system. When this torque is known, together with an acceleration constant determined for each machine from its design data, the change in angular position of each machine during the first time interval can be computed. This change in position, added to the initial position, yields a new angular position for each machine. The generator units are now set to the new angular settings thus computed, power outputs are again determined and changes noted from the initial outputs existing before the initiation of transient conditions, and the computations are repeated to determine changes in angular positions during the second time interval. This is repeated for as many time intervals as are necessary to construct the desired swing curves. This method, with several persons making the required computations, requires from three to four hours to solve a twelve machine problem.

An object of my invention is to provide apparatus for making these computations electrically, so that one person can solve the same problem in from 1 to 2 hours.

The features of my invention which are believed to be novel and patentable will be pointed out in the claims appended hereto. For a better understanding of my invention, reference is made in the following description to the accompanying drawing in which Fig. 1 is a schematic diagram of one form of my invention in which adjustments are manually performed; Fig. 2 is a schematic diagram of a transformer which may be used to modify the apparatus shown in Fig. 1; Fig. 3 is a schematic diagram of another form of my invention embodying automatic adjustment devices, and Fig. 4 is a schematic diagram of one form of follow-up apparatus adapted to be used in the apparatus of Fig. 3.

Referring now to Fig. 1 of the drawing, in a network analyzer a Selsyn generator unit 1 is connected through terminals 2 to a network (not shown) representing an electric power system. Generator unit 1, representing one machine in the power system, is a Selsyn generator of the type commonly used in network analyzers, having a three-phase stator winding excited through terminals 87 from the common three-phase power supply bus of the network analyzer and a single-phase rotor winding adapted to supply an output voltage to the electrical network studied, whose output voltage may be adjusted as to both magnitude and phase angle whereby the generator unit may either deliver power to or receive power from the network to which it is connected. A wattmeter 3 is adapted to measure the power output, either positive or negative, of generator unit 1 and to position an adjustable tap 4 upon a resistor 5 responsive to the value of such measured power. The resistor tap may be connected to be positioned automatically by movement of the wattmeter moving element, or an ordinary indicating wattmeter can be used and the resistor tap manually adjusted to a position, which may be indicated by a calibrated scale, not shown, which corresponds to the wattmeter indication. Resistor 5 has a second adjustable tap 6 and has a constant voltage applied across its ends by a battery 7 or other voltage source so that a voltage is obtained between taps 4 and 6 proportional to the difference between their respective positions on resistor 5. Taps 4 and 6 are connected respectively to opposite ends of a resistor 8 which has an adjustable tap 9. Tap 9 is connected in series to a switch 11, a galvanometer 12, and an adjustable tap 13 on a resistor 14. A reference terminal 10 at one end of resistor 8 is connected to an adjustable tap 15 on resistor 14. Tap 13 is connected in series with a switch 17, a galvanometer 18, and an adjustable tap 19 on a resistor 20. A fixed or reference tap 16 on resistor 14 is connected to an adjustable tap 21 on resistor 20. Tap 19 is connected in series with a switch 23, a voltmeter 24, and a fixed or reference tap 22 on resistor 20. Two batteries 25, or other voltage sources, apply constant voltage across the ends of resistors 14 and 20, as shown.

In solving a power system transient stability problem on a network analyzer equipped with computors of the type shown in Fig. 1, loads and generation in an electrical network representing the system are first balanced according to the desired initial conditions. Wattmeter 3 now measures the initial power output of generator unit 1 and positions tap 4 responsive to such measurement. Tap 6 is now positioned, manually or by other means, adjacent to tap 4 so that taps 4 and 6 are at equal electric potentials and no current flows through resistor 8. Switches 11, 17, and 23 are initially open. When transient conditions are initiated in the network, the power output of generator unit 1 changes in general, and responsive thereto wattmeter 3 changes the position of tap 4, while tap 6 remains in its initial position. The voltage thus introduced between taps 4 and 6 produces a current through resistor 8 which is proportional to the change in power output of generator unit 1 and flows in a direction determined by the sign of such change. Since this change in the power output of generator unit 1 is proportional to the accelerating torque acting upon the corresponding machine in the power system during the first time interval, the current through resistor 8 is a measure of such torque. Tap 9 is positioned, manually or otherwise, so that the position of such tap relative to reference terminal 10 represents the acceleration constant of the machine represented by generator unit 1. Thus a voltage is obtained between tap 9 and terminal 10 proportional both to the current through resistor 8 and to the position of tap 9, or to the product of accelerating torque and acceleration constant which equals the acceleration or change in angular velocity of the machine in the power system during the first time interval. Hereinafter the voltage between tap 9 and point 10 is arbitrarily called the "first voltage."

Taps 13 and 15 are initially positioned adjacent to tap 16. Switch 11 is now closed, so that the first voltage causes a current to flow through galvanometer 12. The position of tap 13 is then adjusted until the current through galvanometer 12 is reduced to zero, after which switch 11 is opened. A voltage is now obtained between taps 13 and 15 which exactly equals the first voltage. Since taps 15 and 16 remain at equal electric potentials, this same voltage is obtained between taps 13 and 16. However, we will now consider that this voltage between taps 13 and 16 represents the sum or integral of first voltages for the time intervals thus far considered, as will more obviously be the case in succeeding time intervals, and thus represents the velocity or change in angular position of the machine during the first time interval.

Strictly considered, to obtain average velocity only one-half the change in velocity during the first time interval should be accumulated, and to obtain greater accuracy this may be done by positioning tap 9 to represent one-half its normal value for the first time interval only, and readjusting tap 9 to represent its full value before beginning the second time interval computations. But if very short time intervals are considered, little error is introduced by leaving tap 9 set at its full value throughout. Hereinafter the voltage between taps 13 and 16 is arbitrarily called the "second voltage."

Tap 19 is initially positioned so that a voltage is obtained between taps 19 and 22 which is proportional to the initial angular position of generator unit 1. Tap 21 is positioned adjacent to tap 19. Switch 17 is closed and the position of tap 19 readjusted until the current through galvanometer 18 is zero, at which point the voltage between taps 19 and 21 exactly equals the second voltage. Switch 17 is opened. Since the voltage between taps 21 and 22 now represents the initial angular position of the generator unit and the voltage between taps 19 and 21 represents the change in such angular position during the first time interval, the voltage between taps 19 and 22 represents the new angular position for the generator unit at the start of the second time interval. Hereinafter the voltage between taps 19 and 22 is arbitrarily called the "third voltage."

Switch 23 is now closed and the third voltage is measured by voltmeter 24, which may be calibrated to read directly in terms of the new angular position of generator unit 1. When the reading has been obtained switch 23 is opened, tap 15 is positioned adjacent to tap 13, and tap 21 is positioned adjacent to tap 19. When this has been done, the computer is ready to begin the second time interval.

When the new angular positions have been determined for all generator units connected in the system, each generator unit 1 is adjusted to its new angular setting and computations for the second time interval are initiated. The position of tap 6 is not changed. In general there will be further changes in power output of the generator unit which will change the current flowing in resistor 8. Switch 11 is closed and tap 13 again adjusted for zero current through galvanometer 12, while tap 15 remains in the position occupied by tap 13 at the end of the preceding time interval. Thus the second voltage equals a summation of first voltages. Switch 11 is opened and switch 17 closed. Tap 19 is adjusted until the current through galvanometer 18 is zero while tap 21 remains in the position occupied by tap 13 at the end of the preceding time interval. Thus the third voltage equals a summation of second voltages plus an initial value representing the initial angular position of generator unit 1. Switch 17 is opened and switch 23 closed. The third voltage is measured by voltmeter 24, thus indicating the new angular position of generator unit 1 for the next time interval. Switch 23 is opened, tap 15 is positioned adjacent to tap 13, and tap 21 is positioned adjacent to tap 19. This cycle is repeated for as many time intervals as are necessary to construct the desired swing curves.

In Figs. 1 and 3 of the drawing I have conventionally shown voltage sources as batteries, but alternating currents and voltages may be used throughout my apparatus if care is taken to keep proper phase relations. One way to do this is to obtain all voltages from different secondary windings of a single transformer. Fig. 2 shows such a transformer adapted for use in the apparatus of Fig. 1, having a secondary winding 7a to be connected in the computer circuit in place of battery 7, and two secondary windings 25a to be connected respectively in place of the two batteries 25. Primary 88 may be energized from any convenient source of alternating electricity, such as a commercial line. Galvanometers 12 and 18 and voltmeter 24, must, of course, now be of a type adapted for use with alternating currents and voltages. If alternating currents and voltages are used, resistors 5, 8, 14, and 20 may be replaced with reactors or complex impedances if such is desired.

So far it has been assumed that in using my apparatus all adjustments are made manually. This can be done and still save considerable time in obtaining swing curves. However, relays and follow-up devices may be added to perform a part or all of these adjustments, except the initial adjustments, and thereby greatly increase the time saved. One form of my invention embodying such automatic adjustment devices is shown in Fig. 3 of the drawing.

In the apparatus shown in Fig. 3, the wattmeter and potentiometer arrangement shown in Fig. 1 has been replaced by a torque balance telemetering unit 26 which is adapted to provide an output electric current proportional to a measured transfer of power. Rotating coil 27, field coil 28, and resistor 29 form a conventional wattmeter type instrument adapted to provide a torque proportional to the power output of generator unit 1. A second rotating coil 30, called the torque-balance coil, cooperating with permanent magnet 31 provides an opposing torque proportional to the current flowing through coil. A spring 32 provides an additional torque the value of which may be adjusted by adjustment screw 33. Light from a lamp 34 is focused into a beam by a lens 35. A mirror 36, adapted to rotate responsive to rotation of coils 27 and 30, the mirror and the rotating coils being connected to a common shaft, deflects the light beam onto a divided mirror or beam-splitter 37, whereupon the beam is divided into two portions which impinge respectively on phototubes 38 and 39. These phototubes are connected as shown in an amplifier circuit comprising vacuum tube 40, resistors 41, 42, and 43, and battery 44 or other voltage source, connected as shown. Resistor 8 is connected in series with coil 30 so that the same current must flow through both. In the operation of the torque balance telemetering unit, the torque provided by rotating coil 27 is always exactly balanced by the torques provided by coil 30 and spring 32. If the torque of coil 27 increases, mirror 36 is slightly rotated thereby so that more light impinges on phototube 38 and less light on phototube 39. This raises the grid voltage of vacuum tube 40, allowing more plate current to flow, which in turn increases the current through coil 30. This increased current increases the torque of coil 30 until the torques are again brought into balance. Such balancing action is very rapid and responsive to very small changes in the measured power.

When initial balance conditions are established in the network analyzed as hereinbefore described, the operator adjusts screw 33 so that the torque provided by spring 32 exactly balances the torque of coil 27 representing the initial power output of generator unit 1. When this has been done no current will initially flow through coil 30 since any such current would unbalance the torques and rotate mirror 36. Now when transient conditions are imposed on the network and there is a change in the power output of generator unit 1 the torque of coil 30 must balance the change in torque of coil 27, so that a current flows through coil 30, and hence through resistor 8, which is at all times proportional to the change in power output from the initial power output of generator unit 1, and the direction of such current flow is determined by the sign of the change in power output.

The function of resistor 8 is identical with the function of the corresponding resistor in the apparatus shown in Fig. 1, and during each time interval a first voltage is obtained between tap 9 and terminal 10 as hereinbefore explained. Lead screw 45 is provided as a convenient means to adjust the position of tap 9, and dial 46 as a convenient means to indicate such position. Lead screw 47 driven by motor 48 positions tap 13, lead screw 49 driven by motor 50 positions tap 15, lead screw 51 driven by motor 52 positions tap 19, and lead screw 53 driven by motor 54 positions tap 21. Relays or automatic switches 55 and 56 replace manual switches 11 and 17 respectively, and relays 57 and 58 form part of the control circuits of motors 50 and 54 respectively, as shown. A timing switch 59 energizes the various relays at the proper time and in the proper sequence, as hereinafter explained. All relays are open when not energized.

Once during each time interval for which the computer operates, relay 55 is energized and closed. This completes an electric circuit from tap 9 through the contacts of relay 55, motor 48, tap 13, and tap 15 to terminal 10. Current flows in this circuit, thus operating motor 48, or a more sensitive follow-up device as hereinafter described, which in turn moves tap 13 until the voltage between taps 13 and 15 exactly equals and opposes the first voltage between tap 9 and terminal 10. When the voltages balance there is no further current flow and the motor ceases to operate. Relay 55 is deenergized and opens and relay 56 is energized and closes. This completes an electric circuit from tap 13 through the contacts of relay 56, motor 52, tap 19, and tap 21 to tap 16. Current flows in this circuit, thus operating motor 52 which in turn moves tap 19 until the voltage between taps 13 and 15 exactly equals and opposes the second voltage between taps 13 and 16. A dial 60 cooperating with lead screw 51 indicates the position of tap 19, which is proportional to the third voltage between tap 19 and point 22. Thus, using this arrangement, there is no need to provide additional means to measure the third voltage. Dial 60 may be calibrated to indicate directly the new angular position of generator unit 1, and may be ganged or coupled by mechanical or electrical positioning means to generator unit 1, as is conventionally indicated by broken lines in Fig. 3, to automatically set the generator unit to its new angular position at the end of each time interval. A recorder, teleprinter, or other record-making device 61 may also be ganged or coupled to dial 60 to automatically record the successive angular positions as they are computed. A dial 62 cooperating with lead screw 47 indicates the position of tap 13, and may be calibrated to indicate directly the respective increments of angular position for each time interval, if such readings are desired. When the readings have been noted, relay 56 is deenergized and opened, and relays 57 and 58 are energized and closed. A circuit is thus completed from tap 13 through motor 50 and the contacts of relay 57 to tap 15. A current flows through this circuit, thus operating motor 50 which in turn moves tap 15 until it is adjacent to tap 13. At the same time a second circuit is completed from tap 19 through motor 54 and the contacts of relay 58 to tap 21. A current flows through this circuit, thus operating motor 54 which in turn moves tap 21 until it is adjacent to tap 19. Relays 57 and 58 are then deenergized and opened, and the apparatus is ready to begin the next cycle.

The form of timing switch 59 shown energizes the various relays in the proper sequence and allows a fixed time for the performance of each operation of the motors or follow-up devices. A contactor 63 is adapted to sweep across and make electrical contact with four contact plates 64, 65, 66, and 67. Pins 68 and 69 limit the travel of the contactor at each end of its path. Spring 70 tends to move contactor 63 from left to right across the contact plates. A damping vane 71 acting in a viscous fluid, or an escapement or other delaying device, restricts the speed of this motion so that the contactor remains in contact with each plate for a length of time sufficient for the completion of the associated operation of the motors or follow-up devices. Relay 72 when energized moves contactor 63 to the left, a double position relay 73 controls the operation of relay 72, and switch 74 permits either full-automatic operation or semi-automatic operation as hereinafter explained. Battery 75 or other voltage source supplies electric power to energize the relays.

For semi-automatic operation switch 74 remains open. Contactor 63, responsive to the action of spring 70, rests in its extreme right position against pin 69. Initial conditions are established in the analyzer electric network, and screw 33 and tap 9 are adjusted as hereinbefore explained. Tap 13 is positioned adjacent to tap 16 and tap 19 is positioned at a point representing the initial angular position of generator unit 1. Transient conditions are introduced into the network and computation is begun. The operator manually moves the armature of relay 73 to its right-hand position. This energizes relay 72 which moves contactor 63 to the left until it contacts pin 68. This energizes the left-hand coil of relay 73 and moves the relay armature to its left-hand position, thus deenergizing relay 72. Contactor 63 moves to the right responsive to the action of spring 70, the speed of such movement being governed by damping vane 71. While the contactor is in contact with plate 64 relays 57 and 58 are energized and closed. Motors 50 and 54 position taps 15 and 21 adjacent to taps 13 and 19 respectively. As the contactor passes to plate 65 relays 57 and 58 open and relay 55 is energized and closed. Motor 48 positions tap 13 as hereinbefore explained. As the contactor passes to plate 66 relay 55 opens and relay 56 is energized and closed. Motor 52 positions tap 19 as hereinbefore explained. Contactor 63 passes to plate 67 and relay 56 opens. The operator now records the reading of dial 60 and sets generator unit 1 to the new angular position thus determined, unless the generator unit and dial are ganged or coupled together in which event the new position of generator unit 1 is set automatically. When the new angular positions have been set up on each generator unit connected to the network, the operator again manually moves the armature of relay 73 to its right-hand position and the cycle is repeated.

Full-automatic operation is exactly the same as semi-automatic operation except that switch 74 is closed, so that when the contactor moves to plate 67 the right-hand coil of relay 73 is energized thereby, thus moving the relay armature to its right-hand position and automatically starting a new cycle without any action by the operator. Successive values of angular position are permanently recorded by recorder 61. Provision is made to supply an electric signal to recorder 61 each time contactor 63 contacts plate 64 whereby recorder 61 may be adapted to record the angular position indicated by dial 60 once during each time interval. In full-automatic operation it is necessary, and in semi-automatic operation it is preferable, that one timing switch 59 regulate all computers associated with all generator units connected to the same network. This is to insure that all the computers will keep in synchronization, and all generator units will be set to their new angular positions at the end of each time interval before a new cycle is started by any of the computers. Other forms of timing switch may be used adapted to initiate each operation of the follow-up devices responsive to the completion of the preceding operation, through relays and electrical contacts opened or closed by the completion of each operation, rather than at definite time intervals. Such switches are known in the art and need not be further described here.

It has hereinbefore been assumed that motors 48, 50, 52, and 54 were simple reversible direct-current electric motors. In a practical application this would not be satisfactory as the unbalance voltages would have to be undesirably large before the motors began to operate. It is therefore necessary to use follow-up devices which are responsive to small voltages. One form of such device is shown in Fig. 4, in which a split-field direct current electric motor 76 is driven by current from an alternating current source 77 and two thyratron rectifiers 78 and 79. Current source 77 produces an alternating voltage at the plates of the thyratrons, and through-transformer 83 and phase-shifting capacitor 84 and resistor 85 applies an alternating voltage at the grids of the thyratrons which lags 90 degrees behind the voltage at their plates. The unbalance voltage from one of the computer circuits is applied across resistor 89, opposite ends of which are respectively connected to the grids of the two thyratrons as shown. Resistors 81 and 82 are provided in the plate circuits of the thyratrons as shown to limit the magnitude of transient current surges and resistor 82 is made variable so that the currents through the two tubes can be made equal for balanced grid-voltage conditions. When no current flows in the associated computor circuit, there is no voltage drop across resistor 80 and the grids of thyratrons 78 and 79 are at equal electric potentials. Under these conditions the thyratrons are adapted to conduct only during the peak positive portions of the alternating grid voltage cycle, or alternatively are biased just to cut-off. Bias voltage is supplied by battery 86 or other suitable means. Variable resistor 82 is adjusted to equalize the currents flowing through the two thyratrons under such balanced conditions, so that the currents flowing through the two halves of the field coil of motor 76 will balance and no rotation of the motor results. When a current flows in the associated computer circuit, hence through resistor 80, as a result of an unbalance in the voltages therein, a voltage drop occurs across resistor 80 so that the grid of one thyratron becomes more positive than the grid of the other. This causes a larger current to flow through the first thyratron and hence through the associated half of the field coil of motor 76, whereby motor 76 rotates in a direction determined by the direction of current flow through resistor 80. Additional sensitivity may be obtained if desired by providing means to amplify the unbalance voltage applied to the thyratron grids, which may be accomplished by conventional vacuum tube or other voltage amplifying circuits. It is not necessary that a separate follow-up circuit of the type described be provided for each motor shown in Fig. 3. One follow-up device may be made to perform a number of the required adjustments sequentially by providing switching means to connect resistor 80 sequentially in the proper computer circuits and to engage the shaft of motor 76 sequentially with the proper associated lead screws. This may be done by means of relays energized in proper sequence by timing switch 59. Likewise, it is obvious that one motor can be made to perform the function of several motors in the apparatus illustrated in Fig. 3, or one galvanometer can be made to perform the functions of both galvanometers and the voltmeter in the apparatus of Fig. 1, if there are provided suitable switching means, which may be relay operated.

The principle of making the operation of my computer automatic or semi-automatic is not restricted to the combination or the particular types and arrangements of follow-up devices shown in Figs. 2 and 3. Other follow-up and control devices are known in the art which will give good results, and the possible combinations of such devices are numerous.

In accordance with the patent statutes, I have described the principle of my invention together with the apparatus which I now consider to represent the best embodiment thereof, but I wish it to be understood that the apparatus described is illustrative only and that the invention may be carried out by other means.

What I claim as new and desire to secure by Letters Patent of the United States is:

1. An electric computer for use with a generator unit in a network analyzer, adapted to compute successive angular settings for said generator unit required in power system transient stability studies wherein the generator unit simulates a machine in the power system studied and has its output circuit connected to a network which simulates other parts of the system, the initial angular setting and the acceleration constant for the generator unit being known, comprising power responsive apparatus connected in the output circuit of the generator unit and having output terminals at which it provides an electric current which for each angular setting of the generator unit is proportional to the difference between the power output of the generator unit at such setting and the power output of the generator unit at its initial setting, a first impedance connected across the output terminals of said power-responsive apparatus, said first impedance having an adjustable tap and a reference terminal, a second impedance having two independently adjustable taps and a reference tap, means to apply a constant voltage across said second impedance, circuit means including a switch and a current-responsive device connecting the adjustable tap and the reference terminal of said first impedance to respective adjustable taps of said second impedance, a third impedance having two independently adjustable taps, means to apply a constant voltage across said third impedance, circuit means including a switch and a current-responsive device connecting an adjustable tap and the reference tap of said second impedance to respective adjustable taps of said third impedance, and indicating means to indicate the position along said third impedance of at least one of its adjustable taps.

2. An electric computer for use with a generator unit in a network analyzer, adapted to compute successive angular settings for said generator unit required in power system transient stability studies wherein the generator unit simulates a machine in the power system studied and has its output circuit connected to a network which simulates other parts of the system, the initial angular setting and the acceleration constant for the generator unit being known, comprising power responsive apparatus having output terminals, a first resistor connected across the output terminals of said power-responsive apparatus, said first resistor having an adjustable tap and a reference terminal, a second resistor having two independently adjustable taps and a reference tap, means to apply a constant voltage across said second resistor, circuit means including a switch and a current-indicating device connecting the adjustable tap and the reference terminal of said first resistor to respective adjustable taps of said second resistor, a third resistor having two independently adjustable taps and a reference tap, means to apply a constant voltage across said third resistor, circuit means including a switch and a current-indicating device connecting an adjustable tap and the reference tap of said second resistor to respective adjustable taps of the third resistor, and a voltmeter connected to respond to voltage between an adjustable tap and the reference tap of said third resistor, said power-responsive apparatus including a wattmeter connected in the output circuit of the generator unit, a resistor having two independently adjustable taps, output terminals respectively connected to said two taps, and means to apply a constant voltage across said resistor.

3. An electric computer for use with a generator unit in a network analyzer, adapted to compute successive angular settings for said generator unit required in power system transient stability studies wherein the generator unit simulates a machine in the power system studied and has its output circuit connected to a network which simulates other parts of the system, the initial angular setting and the acceleration constant for the generator unit being known, comprising power-responsive apparatus having output terminals, a first resistor connected across the output terminals of said power-responsive apparatus, said first resistor having an adjustable tap and a reference terminal, indicating means to indicate the position along the first resistor of its adjustable tap relative to its reference terminal, a second resistor having first and second independently adjustable taps and a reference tap, means to apply a constant voltage across said second resistor, circuit means including a first normally-open relay and a first current-responsive device connecting the adjustable tap and the reference terminal of said first resistor to respective adjustable taps of said second resistor, a second normally-open relay and a second current-responsive device connected in series between the first and second adjustable taps of the second resistor, said first current responsive device being automatic follow-up apparatus adapted when the first relay is closed to change the position of the first adjustable tap and the second resistor responsive to current flow between the first and second resistors to reduce such current substantially to zero, said second current-responsive device being automatic follow-up apparatus adapted when the second relay is closed to move the second adjustable tap on the second resistor to a position adjacent to the first adjustable tap, a third resistor having first and second independently adjustable taps, means to apply a constant voltage across said third resistor, circuit means including a third normally-open relay and a third current-responsive device connecting one adjustable tap and the reference tap of said second resistor to respective adjustable taps on the third resistor, a fourth normally-open relay and a fourth current-responsive device connected in series between the first and second adjustable taps of the third resistor, said third current-responsive device being automatic follow-up apparatus adapted when the third relay is closed to change the position of the first adjustable tap on the third resistor responsive to current flow between the second and third resistors to reduce such current substantially to zero, said fourth current-responsive device being automatic follow-up apparatus adapted when the fourth relay is closed to move the second adjustable tap on the third resistor to a position adjacent to the first adjustable tap, indicating means to indicate the position along said third resistor of at least one of its adjustable taps, and timing means to sequentially close the first relay, third relay, and the second and fourth relays, said power-responsive apparatus including a wattmeter type instrument connected in the output circuit of the generator unit and having a fixed coil and a rotatable coil and shaft adapted to provide a torque proportional to power flow through the generator unit output circuit, means including a rotatable torque-balance coil mounted on the same shaft as the rotatable coil of the instrument to provide a counter-torque proportional to current flowing through the torque-balance coil, output terminals in series with the torque-balance coil, and means to vary the current through the torque-balance coil responsive to small movements of the instrument shaft, to prevent substantial rotation of the shaft.

HAROLD A. PETERSON.

No references cited.

Certificate of Correction

November 22, 1949

Patent No. 2,489,106

HAROLD A. PETERSON

It is hereby certified that error appears in the printed specification of the above numbered patent requiring correction as follows:

Column 5, line 57, after the word "through" insert *such*;

and that the said Letters Patent should be read with this correction therein that the same may conform to the record of the case in the Patent Office.

Signed and sealed this 23rd day of May, A. D. 1950.

[SEAL]

THOMAS F. MURPHY,
*Assistant Commissioner of Patents.*